Nov. 26, 1968 G. RAINS 3,412,597
TOOL FOR RIVETS
Filed Aug. 12, 1966
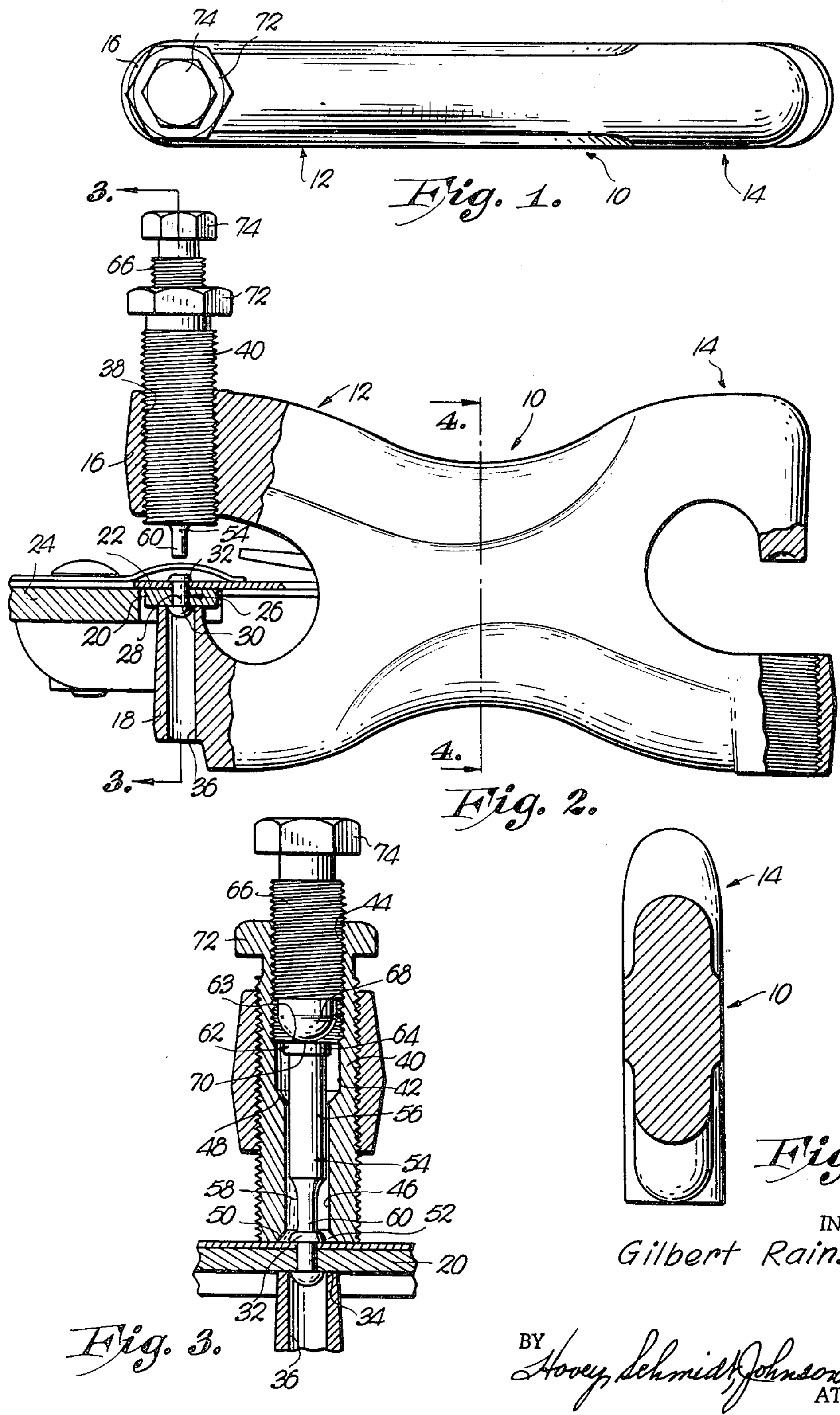
INVENTOR
Gilbert Rains
BY Hovey, Schmidt, Johnson & Hovey
ATTORNEYS

United States Patent Office 3,412,597

Patented Nov. 26, 1968

3,412,597

TOOL FOR RIVETS

Gilbert Rains, Hutchinson, Kans., assignor to Rains Manufacturing Company, Inc., Hutchinson, Kans., a corporation of Kansas Filed Aug. 12, 1966, Ser. No. 572,023
5 Claims. (Cl. 72—454)

The instant invention relates to a hand tool adapted for removing rivets.

As disclosed in U.S. Letters Patent No. 3,230,751, issued Jan. 25, 1966, and entitled "Riveting Tool For Sickles," it is desirable to repair or replace damaged sickle sections without removing the sickle mounting strip from the cutter bar. The tool disclosed in the above patent partially alleviated the time-consuming operations previously required by providing a tool for riveting the section to the strip while the sickle is on the bar. However, removal of rivets must be accomplished before replacement of a new section or repair thereof.

It is, therefore, the primary object of the instant invention to provide a hand tool which can be used for removal of rivets interconnecting the sickle section and the mounting strip of a sickle while the latter remains in an operative position on the cutter bar so as to minimize the time and expense of replacing damaged sickle sections.

Another object of the instant invention is the provision of a hand tool of the type described which can be used by a single workman for the removal of rivets by the application of pressure thereto so that sickle sections may be readily removed from the sickle of a cutter bar by the operator of the machine to which the cutter bar is attached without the assistance of other workmen and while the sickle remains mounted on the cutter bar.

A further object of the present invention is the provision of a tool for accomplishing the aforesaid purposes and which not only removes rivets by pressing the same from the sickle, but which is clampable against the sickle for maintaining the latter and the tool in positive alignment during the removal operation.

Yet another object of the present invention is to provide such a tool having a punch reciprocable toward and away from the rivet to be removed within guide means disposed for supporting the punch against lateral deflection whereby to preclude fracturing of the punch as the same is forced against the rivet.

A still further object of the invention is the provision of screw means, separate from the punch, for forcing the punch against the rivet without rotation of the punch so that the punch is not twisted during the removal operation whereby the danger of fracturing the same is minimized.

As a corollary to the foregoing object, a flat surface has been provided on the terminus of the punch adjacent the screw and a rounded extremity has been provided on the latter for engaging the flat surface to the end that the screw is freely rotatable relative to the punch.

In the drawing:

FIGURE 1 is a top plan view of a hand tool made pursuant to the concepts of the instant invention;

FIG. 2 is a side elevational view of the tool after having been moved into position for removing a rivet from the sickle of a cutter bar and illustrating the jaw of the tool before the same has been moved toward the dolly to clamp the sickle therebetween, parts being broken away and in section to illustrate details of construction;

FIG. 3 is a view taken along line 3—3 of FIG. 2 but illustrating the position of the tool after the jaw has been moved toward the dolly with the sickle therebetween; and FIG. 4 is a view of the tool taken along line 4—4 of FIG. 2.

Tool 10 has a pair of opposed, C-shaped bodies 12 and 14 at opposite ends thereof. Body 14 is adapted for receiving a jaw and a bolt as disclosed, for example, in the above-referenced patent for closing rivet heads. Body 14 and the components receivable thereby, play no part in the instant invention and, therefore, further description is unnecessary.

Body 12 presents a boss 16 and a dolly 18, the latter components all being spaced apart for receiving the mounting strip 20 and the knife section 22 of a cutter bar 24 therebetween. As can be seen in FIG. 2, strip 20 and section 22 are joined through the medium of a rivet 26 having a shank 28 and opposed headed ends 30 and 32. Dolly 18 has a rest 34 for supporting the sickle strip 20, and a rivet-receiving hole 36 extending from rest 34 through dolly 18.

A tapped opening 38 in boss 16 is aligned with hole 36, and a jaw 40 is threaded into opening 38 for movement toward and away from rest 34, jaw 40 being operable to clamp the section 22 to strip 20 and against rest 34. Jaw 40 has a bore 42 extending therethrough in alignment with hole 36. Bore 42 has a threaded portion 44 and a support portion 46, the latter being disposed between portion 44 and rest 34. Portion 44 is larger in diameter than portion 46, and an annular shoulder 48 is disposed therebetween. An annular chamfered surface 50 at the lower end of jaw 40, as can be seen in FIG. 3, is coaxial with portion 46 and presents a recess 52 for receiving headed end 32.

A rivet-removing punch 54 is received in portion 46 and is reciprocably guided thereby for sliding movement toward and away from rest 34. Punch 54 has a main shank 56 and a shaft of reduced cross-sectional size, the latter being tapered inwardly toward terminus 60 of the punch. Punch 54 has an outturned flange 62 and an upwardly facing flat face 63 at the opposite terminus 64 thereof within bore 42.

A screw 66 is received in portion 44 and is freely rotatable therein separately from punch 54 for movement toward and away from the latter. Screw 66 has a hemispherical extremity 68 disposed within bore 42 presenting an arcuate surface 70 engageable with face 63. Jaw 40 is provided with a wrench-receiving head 72 at the upper end thereof and screw 66 is provided with a similar wrench-receiving head 74.

Viewing FIG. 2, hand tool 10 is illustrated in the position relative to rivet 26 for removal of the latter from strip 20 and section 22. As shown, terminus 60 of punch 54 has not yet engaged headed end 32 of rivet 26 and, therefore, punch 54 has gravitated into a position with flange 62 engaging shoulder 48. Thus, the interengagement between flange 62 and shoulder 48 prevents punch 54 from falling out of jaw 40. A wrench (not shown) is placed on head 72 of jaw 40 and the latter is rotated thereby and moved toward section 22. Terminus 60 of punch 54 will contact headed end 32 as jaw 40 is moved toward the latter; however, punch 54 is merely hanging from shoulder 48 in spaced relationship with respect to surface 70 of jaw 66. Hence, as jaw 40 is moved toward section 22, punch 54 will be shifted relatively upwardly within portion 46 permitting jaw 40 to be clamped tightly against section 22 as can be seen in FIG. 3. It is to be noted that, as jaw 40 is moved toward section 22, headed end 32 is engageable by chamfered surface 50 for shifting jaw 40 laterally, thereby positioning headed end 32 within recess 52 and in alignment with portion 46 of bore 42.

Viewing FIG. 3, screw 66 has been rotated through the medium of a wrench (not shown) acting on head 74 and thereby moved into a position with arcuate surface 70 engaging flat face 63 of punch 54. Further rotation of screw 66 will force punch 54 downwardly toward rivet 26. It can be seen that terminus 60 of punch 54 is configured to coincide approximately in cross-sectional diameter with the diameter of shank 28 and, therefore, continued movement of punch 54 by screw 66 toward rivet 26 will force the latter downwardly and into hole 36.

Manifestly, the arcuate surface of screw 66, and the flat face of punch 54, permit the screw to be freely rotatable with respect to punch 54 while the latter is being shifted toward rivet 26 by screw 66. Thus, even though terminus 60 of punch 54 is tightly engaged with rivet 26 while forcing the same from the sickle, screw 66 may be rotated without causing development of torsional stress within punch 54. Further, portion 46 provides a guide for punch 54 as the latter is forced toward rivet 26 to prevent lateral movement of punch 54. Moreover, jaw 40 not only guides punch 54 as the latter is forced toward rivet 26, but also clamps tightly against section 22 to prevent twisting of tool 10 as screw 66 is forced downwardly against punch 54 by rotation of head 74. Hence, the tendency of punch 54 to twist and bend is minimized and, therefore, fracturing of the same is substantially precluded.

Having thus described the invention, what is claimed as new and desired to be secured by Letters Patent is:

1. A hand tool for removing a malleable rivet connecting the knife section and mounting strip of a sickle while the sickle is in the cutter bar of a mowing machine, the rivet having opposed headed ends and a shank passing through the section and strip, said tool comprising:

a handle having a C-shaped body at one end thereof, presenting a boss and a dolly, the boss and the dolly being spaced apart for receiving the strip and the section therebetween, the dolly having a rest for supporting the sickle, said dolly having a rivet-receiving hole extending from said rest, there being a tapped opening in the boss aligned with the hole;

a jaw threaded in said opening and movable toward and away from the rest for clamping the section to the strip against the rest, said jaw having a bore therethrough aligned with said hole, the bore having a threaded portion, and a support portion between the rest and the threaded portion;

a punch reciprocably guided in said support portion for sliding movement toward and away from the rest; and a screw in said threaded portion and freely rotatable separately from said punch for movement toward and away from said punch, said screw having an extremity disposed in the jaw for engaging said punch upon rotation of the screw in a direction to move the latter toward said punch, whereby upon further rotation of said screw in said direction, said punch is moved toward said rest, said punch having a terminus disposed exteriorly of the jaw for engaging one headed end of the rivet upon movement of the punch by rotation of the screw in said direction for pressing the rivet from the sickle into said hole while the sickle is held clamped between the rest and the jaw.

2. A hand tool as set forth in claim 1, wherein said jaw has an annular chamfered surface, coaxial with said support portion, remote from said threaded portion, presenting a recess for receiving said one headed end of said rivet to maintain the latter and said support portion in alignment.

3. A hand tool as set forth in claim 1, wherein the opposite terminus of said punch has a flat face for engagement by said extremity of the screw, said extremity being hemispherical presenting an arcuate surface for engaging said face whereby the screw revolves freely relative to the punch during rotation of the screw while engaged with the punch.

4. A hand tool as set forth in claim 1, wherein said punch has a main shank and a shaft of reduced cross-sectional size, said shaft being tapered inwardly toward said terminus.

5. A hand tool as set forth in claim 4, wherein said punch has an outturned flange at the opposite terminus thereof within said bore, said jaw having an annular shoulder coaxial with said bore between the portions within the latter, said flange and said shoulder being interengageable for limiting outward movement of said punch relative to said jaw.

References Cited

UNITED STATES PATENTS

| | | | |
|---|---|---|---|
| 2,826,893 | 3/1958 | Falk | 59—7 |
| 3,230,751 | 1/1966 | Smith | 59—7 |
| 3,234,634 | 2/1966 | Johnson | 59—7 |

CHARLES W. LANHAM, *Primary Examiner.*

G. P. CROSBY, *Assistant Examiner.*